United States Patent [19]

Vosa

[11] Patent Number: 5,618,908

[45] Date of Patent: Apr. 8, 1997

[54] POLYESTER RESIN WITH IMPROVED COLOR CHARACTERISTICS

[75] Inventor: Renato Vosa, Casagiove, Italy

[73] Assignee: Sinco Engineering S.p.A., Italy

[21] Appl. No.: 681,323

[22] Filed: Jul. 22, 1996

[30] Foreign Application Priority Data

Jul. 27, 1995 [IT] Italy .................... MI95A1636

[51] Int. Cl.⁶ .................... C08G 63/46; C08K 5/16
[52] U.S. Cl. .................... 528/288; 528/272; 528/288; 528/298; 528/302; 528/308; 528/308.6; 524/714; 524/770
[58] Field of Search .................... 528/272, 288, 528/298, 302, 308, 308.6; 524/714, 770

[56] References Cited

U.S. PATENT DOCUMENTS

| | | | |
|---|---|---|---|
| 4,304,838 | 12/1981 | Hasegawa et al. | 430/253 |
| 5,393,651 | 2/1995 | Hoshi | 430/526 |
| 5,397,676 | 3/1995 | Yokoya et al. | 430/203 |

*Primary Examiner*—Samuel A. Acquah
*Attorney, Agent, or Firm*—Edward D. Manzo; Mark J. Murphy

[57] ABSTRACT

Aromatic polyester resins having improved color characteristics obtained incorporating in the resins in the preparation phase of the resin by polycondensation of a diol with an aromatic bicarboxylic acid a violet toner formed of 9,10 anthraquinone -2-hydroxy-4-p-toluidine or having an absorption spectrum comparable to that of the above anthraquinone compound.

10 Claims, No Drawings

POLYESTER RESIN WITH IMPROVED COLOR CHARACTERISTICS

DESCRIPTION

The present invention concerns polyester resins having improved color characteristics. As it is known, the polyester resins production process, in particular of polyethylene terephthalate and its copolymers used for the production of fibres, films and hollow bodies for food containers, occurs through an esterification or transesterification reaction depending whether the starting material used are terephthalic acid or the respective dimethyl ester, followed by a polycondensation reaction in the melt state up to the achievement of the polymerization degree suitable for the end application.

The polycondensation reaction mentioned above could be performed by using a continuous or batch process. Usually it is conducted by heating the reaction mixture from 250° to 300° C. operating at a reduced pressure in a range from 760 to 0.5 mmHg abs and for a residence time from 60 to 200 min.

Under these process conditions, by increasing the average molecular weight and therefore the viscosity of the reaction mass of the residence time at high temperature, thermal degradation phenomena occur in a higher and remarkably higher degree that bring to intermolecular breakage particularly of already formed ester bonds breaking and of chain terminal hydroxyl groups with formation of vinyl ester groups and increase of the carboxylic end groups.

As a consequence of the formation of the vinyl ester end groups, the polymer gets a coloration more or less yellow depending on the conditions of the degradation phenomena to which it is subjected.

Despite the optimization of the process conditions, the addition of thermal stabilizers (phosphoric acid, phosphorous acid and its derivatives), the choice of the type and quantity of the polymerization catalyst(s), nonetheless it was necessary for the color control of the polymer, the addition of bivalent cobalt salts ($Co(CH_3COO)_2 2H_2O$, $COCl_2$, cobalt heptanate, etc.) that with their blue coloration are capable to shift towards lower frequencies the yellow absorption bands presented by the polymer.

The use of cobalt salts as color controlling agents is widely described in the literature. The higher and higher development, starting form the eighties, of polyethylene terephthalate in the food containers sector, application that technically doesn't permit the filtration of the polymer in the transformation phase, has highlighted the disadvantages of the use of cobalt salts as blue toners mainly due to the formation of insoluble residue of cobalt terephthalate and of the elevated cost of these compounds. To overcome the problems mentioned, recently it was described the use of dyes that are soluble in the polymer, having the same function of the cobalt salts, formed of a mixture of blue and red toners having the function to shift rewards lower frequencies the absorption of the yellow coloration present in the polymer.

In U.S. Pat. No. 5,235,027 the simultaneous use of two toners respectively ESTOFIL BLUE S-RBL and ESTOFIL RED-S-GFP is described. In fact, for the control of the polymer color (Col L, Col b, Col a) it is not sufficient the use of only one blue toner that influences only on Col b (blue-yellow scale), but it is also necessary the addition of a red toner for the control of Col a.

The use of these toners, if it resolves sufficiently well the problem of the polymer color control (in particular the addition of the red toner improves Col a), nonetheless presents stability problems in the level of the polymer color during the time, both in case of the batch and more markably of the continuous polymerization process.

This instability is principally due to the fact that the toners in question are not soluble in the normal feeding reaction medium that is normally formed of ethylene glycol, but form suspensions.

In particular, the suspension of ESTOFIL RED S-GFP has very low settling times that make very difficult, under the normal operating conditions of the industrial process, the maintenance of the blue/red ratio to the prefixed values for a correct management of the polymer quality.

The use of violet toners is proposed for the correction of the already formed color in the polymer. The toner is added to the polymer in the extrusion phase. The average residence time of the toner in the melted polymer is much less than the residence time of the polymer during the melt polycondensation phase. The temperature conditions during this phase are much higher than those used in extrusion.

Furthermore, the polymer for most applications undergoes a polycondensation treatment in the solid state to increase the intrinsic viscosity. The temperature of the treatment in general is in the range between 180° and 230° C.; the residence time is rather long (several hours).

Because of the thermal conditions indicated above, the toner which is already added in the preparation phase of the resin could undergo structural modifications altering the absorption capacity in the desired region of the spectrum.

The use of a violet toner already added in the preparation phase of the resin should not allow the flexibility obtained with the use of a mixture of blue and red toner.

It has now been found that it is possible to control the undesired colorations that are caused by decomposition reactions of a polyester resin in the course of the polycondensation reaction in the melt state, adding to the esterification or transesterification or polycondensation mixture in the melt state a violet toner chosen among the anthraquinones dyes having 9,10-anthraquinone-2-hydroxy-4-p-toluidine structure.

The presence of such toners on the course of the polycondensation reaction allows to obtain Hunter colors comprised in the range from –2,5 to 0.0 for color a and from –6 to 0.5 for color b.

A particularly suitable violet tuner is the violet color Sandoplast RBS-FP sold by Sandoz, having the structure 9,10-anthraquinone-2-hydroxy-4-p-toluidine. The usable violet toners, besides presenting a spectrum of absorption similar to that of the Sandoplast RBS-FP violet, have to be stable under polycondensation conditions wherein the temperature could vary between about 250° and 300° C. for residence times of more than 1 hour.

A suitable test to verify, the thermal stability is the capacity of the toner to maintain the coloration in crystal polystyrene in concentrations of 0.05% in weight operating at 300° C. for more than 20 minutes.

Additional necessary characteristics of the toner are to be sufficiently soluble in ethylene glycol or similar glycols used for the preparation of the resins and to allow to cover within a wide range the undesired coloration originated by the variations of the operative conditions, in particular of the temperature during the resin preparation.

The reaction of the formation of the resin starting from aliphatic diols with 2–12 carbon atoms and from aromatic bicarboxylic acid is carried out according to the known techniques.

The preferred polycondensation catalysts are made up of Sb compounds (Sb$_2$O$_3$,Sb-triacetate).

Other catalysts are made up, for example, of compounds of Ti and/or of Ge.

In case of resin preparation starting from dimethyl terephthalate and similar alkyl esters, compounds of the type of zinc acetate can be used as transesterification catalysts. Thermal stabilizers such as organic phosphite or phosphate are incorporated in sufficient quantities to stabilize the prepolymer.

The polycondensation temperature in the melt state is in general comprised between 150° and 300° C. It is operated under vacuum (from 0.5 to some mm Hg). The violet toner is used for the modification of the color, preferably of polyethylene terephthalate, and of copolymers in which up to 20% of the units deriving from terephthalic acid are substituted by units deriving from aromatic bicarboxylic acids such as isophthalic acid, 2,6-naphthalene dicarboxylic and their mixture, and furthermore of polybuthylene terephthalate and polyalkylene naphthalates.

The resins are used for the production of fibres and films or to produce articles, such as for example beverage containers, by extrusion-blow molding and injection blow-molding.

The following examples are provided to illustrate and not to limit the invention.

EXAMPLE 1

A dispersion was prepared containing 0.01 parts of Violet Sandoplast RSB-FP toner in 100 parts of ethylene glycol (EG) (dispersion A). Such dispersion, maintained in an agitated container equipped with a blade stirrer running at 50 rpm was used for the preparation of 10 PET batches with the procedure described below.

PET Preparation Procedure

In an autoclave, 100 parts of terephthalic acid (TPA) are mixed with 44.8 parts of EG, 2.4 parts of dispersion A and 0.032 parts of Sb$_2$O$_3$. The mixture is heated up to 260° C. at pressure of 1.5 bar while the water produced by the esterification reaction is removed in a packed distillation column. The oligomer mixture produced, after an average reaction time of 190 minutes, is then heated up to 280° C. while the pressure is reduced up to 1 mmHg.

After an average time of polymerization of 170 minutes, a polymer with the following characteristics is obtained:

| | |
|---|---|
| Intrinsic Viscosity (IV) dl/g | 0.600 ± 0.01 |
| Color L | 75 ± 1 |
| Color b | −6 ± 1 |
| Color a | −1 ± 0.5 |

COMPARISON EXAMPLE 1

A dispersion was prepared containing 0.005 parts of Red Estofil SGFP and 0.005 parts of Blue SRBL with the same procedure described in Example 1. Such dispersion was used for the production of 10 batches with the same procedure described in Example 1. The average esterification and polymerization times were 190 and 170 minutes respectively.

The average qualitative characteristics of the polymer produced are:

| | |
|---|---|
| Intrinsic Viscosity (IV) dl/g | 0.600 ± 0.01 |
| Color L | 74 ± 2 |
| Color b | −4.5 ± 2 |
| Color a | −2 ± 1 |

With respect to Example 1, the reduction of color L is noted as well as the increase of Colors b and a, especially in the case of the last batches carried out utilizing a toner disperson with long storage time.

ANALYTICAL DETERMINATIONS

The intrinsic viscosity is measured in a solution of 0.5 g polymer in 100 ml of a mixture of 60/40 by weight of phenol and tetrachloroethane at 25° C. according to ASTM 4603.86.

The measurements of the Hunter color grade a and b are determined, according to known methods, on polymer granules crystallized for 1 h at 150° C.

What is claimed is:

1. Aromatic polyester resins having Hunter color values comprised between −2.5 and 0.0 for color a and between −6 and 0.5 for color b, obtained by adding in the preparation phase of the resin by esterification or transesterification and successively polycondensation in the melt state, a violet toner having an absorption spectrum comparable to that of 9,10-anthraquinone-2-hydroxy-4-p-toluidine and thermally stable at 300° C. for more than 20 minutes in polystyrene crystal in concentration of 0.05% by weight.

2. Resins according to claim 1 in which the anthraquinone compound is 9,10-anthraquinone-2-hydroxy-4p-toluidine.

3. Resins according to claim 1 in which the toner is an anthraquinone compound with absorption specimen comparable to that of 9,10-anthraquinone-2-hydroxy-4-p-toluidine and with thermal stability in the polystyrene crystal at 300° C. for more than 20 minutes in concentrations of 0.05% by weight.

4. Polyester resins according to the claim 1 selected from polyethylene terephthalate, ethylene terephthalates copolymers in which up to 20% by moles of units from terephthalic acid are substituted by units deriving from aromatic bicarboxylic acids chosen between isophthalic acid and 2,6-naphthalene dicarboxylic acid and their mixtures.

5. Manufactured articles obtained from the resins of claim 1.

6. Polyester resins according to claim 2 selected from polyethylene terephthalate, ethylene terephthalates copolymers in which up to 20% by moles of units from terephthalic acid are substituted by units deriving from aromatic bicarboxylic acids chosen between isophthalic acid and 2,6-naphthalene dicarboxylic acid and their mixtures.

7. Polyester resins according to claim 3 selected from polyethylene terephthalate, ethylene terephthalates copolymers in which up to 20% by moles of units from terephthalic acid are substituted by units deriving from aromatic bicarboxylic acids chosen between isophthalic acid and 2,6-naphthalene dicarboxylic acid and their mixtures.

8. Manufactured resins obtained from the resins of claim 2.

9. Manufactured resins obtained from the resins of claim 3.

10. Manufactured resins obtained from the resins of claim 4.

* * * * *